United States Patent [19]

Davis

[11] Patent Number: 4,803,951
[45] Date of Patent: Feb. 14, 1989

[54] ENCLOSURE FOR PETS

[76] Inventor: L. Dan Davis, 4139 Viewcrest Rd., South Salem, Oreg. 97302

[21] Appl. No.: 104,347

[22] Filed: Oct. 2, 1987

[51] Int. Cl.$^4$ ............................................. A01K 1/02
[52] U.S. Cl. ..................................................... 119/19
[58] Field of Search ................... 119/17, 19; 135/101, 135/109

[56] References Cited

FOREIGN PATENT DOCUMENTS 552377 1/1923 France ................................. 119/17
830150 3/1960 United Kingdom .................. 119/19

Primary Examiner—Robert Peshock
Assistant Examiner—R. Thomas Price
Attorney, Agent, or Firm—Chernoff, Vilhauer, McClung & Stenzel

[57] ABSTRACT

A light, easily-erected, collapsible pet carrier for use inside a motor vehicle such as a station wagon, for confining an animal such as a dog and protecting the interior of the motor vehicle from being soiled by the pet. A collapsible, lightweight frame of interconnectable members supports a flexible fabric cover whose upper portions are of substantially transparent and air-permeable material such as netting. The upper portions of the carrier provide ventilation and additional space for the animal within the motor vehicle, without obstructing rearward vision by the operator of the motor vehicle. A bottom member and lower portions of walls of the pet carrier are of waterproof flexible material.

14 Claims, 1 Drawing Sheet

ENCLOSURE FOR PETS

BACKGROUND AND SUMMARY OF THE INVENTION

The present invention relates to carrying pets in motor vehicles, and particularly to a lightweight device for restricting movement of a pet within a motor vehicle, yet providing ample room, light, and ventilation for the animal, without obstructing the field of visibility of the vehicle's operator.

Animals, particularly dogs, moving about freely in motor vehicles can deposit a great deal of dirt and loose hair and the like throughout the motor vehicle, on seat covers and rugs. Saliva and mucus are likely to be deposited on windows and other surfaces within the car. In particular, hunting dogs returning from a day afield are likely to have dust, seeds, burrs, and mud in their coats or on their feet, and family pets returning from a hike or a day at the beach may be nearly as dirty.

Pet carriers in various forms have long been available for use in connection with automobile transport of animals, but all of those known to the present inventor have had various difficulties or disadvantages which the present invention attempts to overcome. Some previous efforts to produce a suitable pet carrier for use in or on an automobile have dealt with the conversion of a luggage compartment of an automobile, as in Wuest U.S. Pat. No. 2,194,993 and Blend, Jr. U.S. Pat. No. 3,107,649.

Other previous pet-carrying devices for use in automobiles would be inadequate for confining large dogs, for example, the one shown in Poczatek U.S. Pat. No. 3,132,781.

Olson U.S. Pat. No. 2,897,781 provides a carrier for use attached to the outside of a motor vehicle. Such a carrier is unnecessarily heavy and complex and would apparently be unnecessarily costly, although it does provide a pair of transparent window panes in order not to obstruct rearward visibility for the operator of vehicle on which the carrier is mounted. However, a pet carried in such a carrier would be likely to obstruct the operator's view, regardless of the presence of the windows in the carrying device.

May U.S. Pat. No. 4,546,728 discloses a large, rigidly constructed carrier for use within the rear passenger compartment of a motor vehicle such as a four door sedan. The May device provides for rearward visibility by including front and rear window panes. While the device serves the purpose of providing a carrying place for animals within vehicles other than station wagon-type automobiles, the device is unnecessarily heavy and awkward for use in station wagons, and occupies a great deal of space when it is not in use.

Pets, if well-trained, do not require strongly constructed devices merely to keep them within certain areas of the interior of a motor vehicle. While they need to be kept from climbing or jumping on the seats and in other undesired places within the motor vehicle, this can be accomplished without massive or rigidly constructed carriers such as those of the prior art.

It is therefore a principal object of the present invention to provide an easily installed and inexpensive device for restraining animals, particularly large dogs, within a desired area of the interior of a motor vehicle.

It is another important object of the present invention to provide a device for use while carrying pets, including large dogs, in a motor vehicle, in which ample space is provided for the pets without interfering with the ability of the motor vehicle operator to see through the vehicle's rear or side windows. It is desirable, however, to provide a device which does not require the use of glass panes or other rigid materials which may be undesirably heavy or expensive or which would prevent the pet-carrying device from being folded into a compact package for storage.

It is a principal feature of the pet carrying device of the present invention that it includes upright walls and a horizontal top portion of fabric of sufficient strength to restrain a pet yet transparent enough not to obstruct the field of vision of the operator of a vehicle in which the pet carrier is being used, and permeable enough to provide ample ventilation for a pet contained with the pet carrier.

Optimally, a pet carrying device for use in an automobile should be easy to clean and capable of being disassembled and packed easily in a minimum amount of space when not in use.

It is another principal feature of the pet carrier of the present invention that it includes a supporting frame which is light in weight, in combination with a cover of flexible material which can be cleaned easily, and which can be removed and folded and stored in a small amount of space. The frame can also be disassembled and stored in a relatively small amount of space.

It is an important advantage of the present invention that it is less expensive than the carriers of rigid construction used for carrying and protecting pets during commercial transportation.

A pet carrier according to the present invention includes a supportive frame of light, rigid members interconnected with one another to provide support for a flexible fabric cover which is stretched over the frame, defining an area within which a pet can be penned. A horizontal bottom member and lower portions of three vertical walls of the cover are of waterproof material, in order to protect the interior of the motor vehicle in which the carrier is used.

The upper portions of the vertical walls, and, preferably, a horizontal top side of the cover, are of a substantially transparent fabric such as a suitable mesh fabric or netting, of loosely woven or knitted construction of small but strong threads. This is in order not to interfere with visibility, even though the upper portion of the carrier may be located in the line of sight between a motor vehicle's rear view mirror and the rear windows of the vehicle. An additional reason for the use of such fabric is that the upper portion of the cover should be able to provide for free transfer of air to and from the interior of the space defined by the pet carrier of the present invention.

In a preferred embodiment of the invention, intended for use within the rear portion of a vehicle such as a station wagon, a vertical front wall, vertical right and left side walls, a horizontal bottom, and a horizontal top are provided. A rear side is open, providing access to the interior of the carrier when the tailgate of the station wagon is opened. In such an embodiment of the invention, the bottom extends rearward farther than the top of the carrier, and the rear margins of the vertical right and left side wall portions of the cover are sloped rearwardly and downwardly, conforming generally to the slope of the interior of the station wagon so as to contain the animal effectively when the tailgate is closed.

Preferably, the interior frame structure of the pet carrier of the present invention is easily assembled and disassembled outside the cover, yet the cover holds the individual pieces together in mated relationship when the frame is located within the cover. Additionally, in a preferred embodiment of the invention, upper and lower transverse horizontal frame members are located within transverse tubular margin portions at the rear edges, respectively, of the top and bottom portions of the cover. This arrangement holds the cover in place surrounding the frame.

The pet carrier of the present invention is light in weight, and because of the waterproof construction of its bottom and the lower portions of the vertical walls, it protects the interior surfaces of the motor vehicle in which it is used. Not only is such a lightweight pet carrier easily handled for placement into or removal from the interior of a motor vehicle, but its waterproof construction makes it easy to keep the pet carrier clean simply by washing it with an ordinary garden hose and allowing it to dry. The relatively confined space within a pet carrier of this nature is apparently attractive to dogs, which enjoy curling up within the carrier. The carrier may thus be used not only within the vehicle, but in a house where a family to which a pet belongs is temporarily staying.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
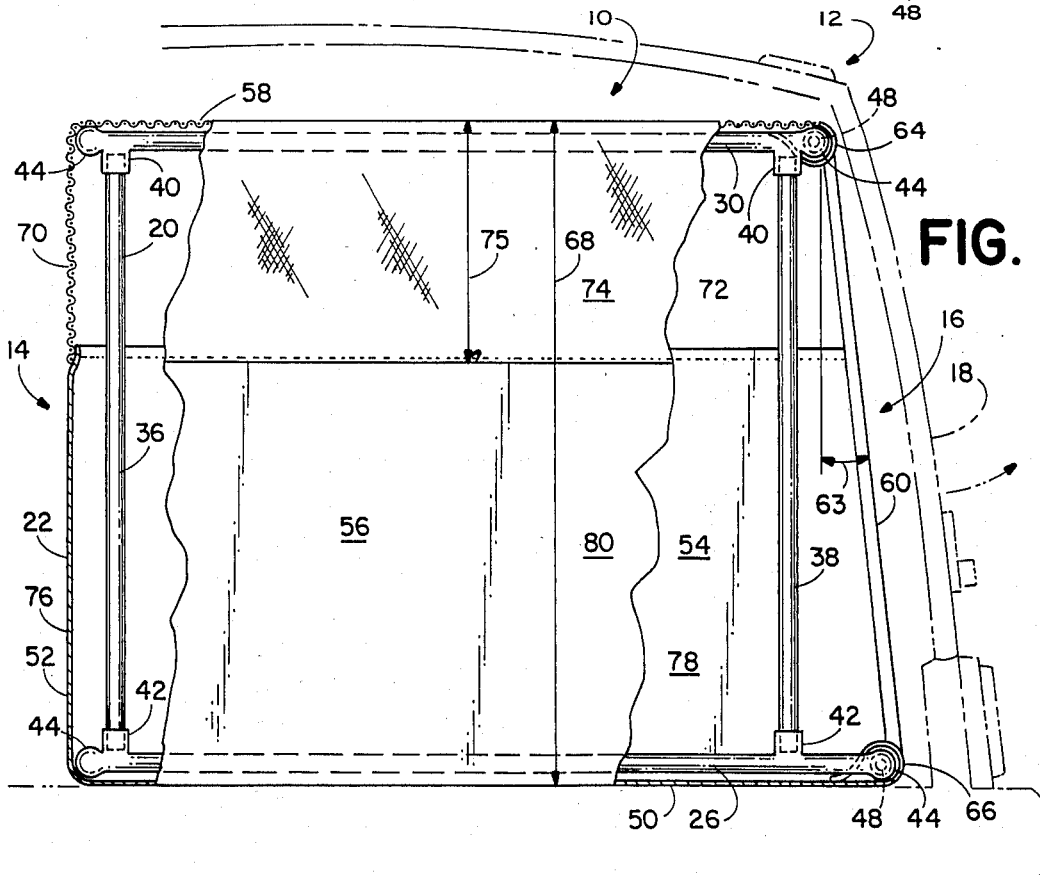
FIG. 1 is a partially cutaway side elevational view of an exemplary pet carrier embodying the present invention, shown in position in the rear compartment of a motor vehicle.

Referring now to the drawings which form a part of the specification, in FIG. 1, a pet carrier 10 which is a preferred embodiment of the present invention is shown located properly within the rear enclosed portion of a motor vehicle 12 (shown in phantom line), which is in this instance a station wagon-type vehicle. The carrier 10 will thus be understood to have a front end designated generally as 14, and a rear end 16 located adjacent the tailgate 18 of the motor vehicle 12, which will be understood to be openable in the conventional manner, as by swinging upward about hinges having a horizontal transverse axis of rotation with respect to the motor vehicle 12.

The pet carrier 10 includes an internally located frame 20 and a cover 22, fitted about the exterior of the frame 20 and supported by it so as to define a space enclosed by the pet carrier except for one open side which in the embodiment shown is the rear end 16 of the carrier 10.

The frame 20 includes respective right and left lower longitudinal members 24 and 26 which are of lightweight construction, preferably being made of a strong, stiff, and durable material, such as polyvinylchloride pipe, which is nontoxic and is easily kept clean. As may be seen best in FIG. 1, the right and left lower longitudinal members 24 and 26 extend from the front end 14 to the rear end 16 of the carrier. Right and left upper longitudinal members 28 and 30 of similar construction extend from the front end 14 to the rear end 16 of the carrier 10 above the lower longitudinal members.

Figure 3:
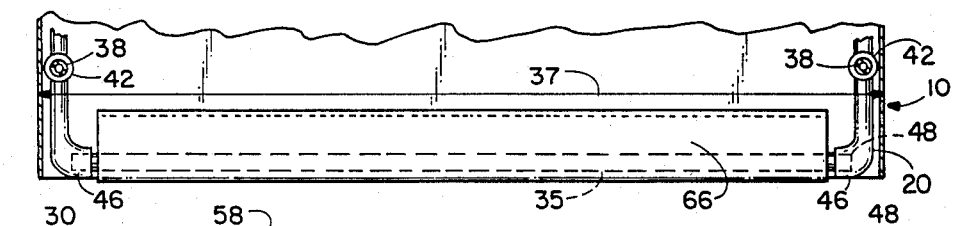
FIG. 3 is a sectional view of a portion of the pet carrier shown in FIGS. 1 and 2, taken along the line 3—3 of FIG. 2.
Figure 2:
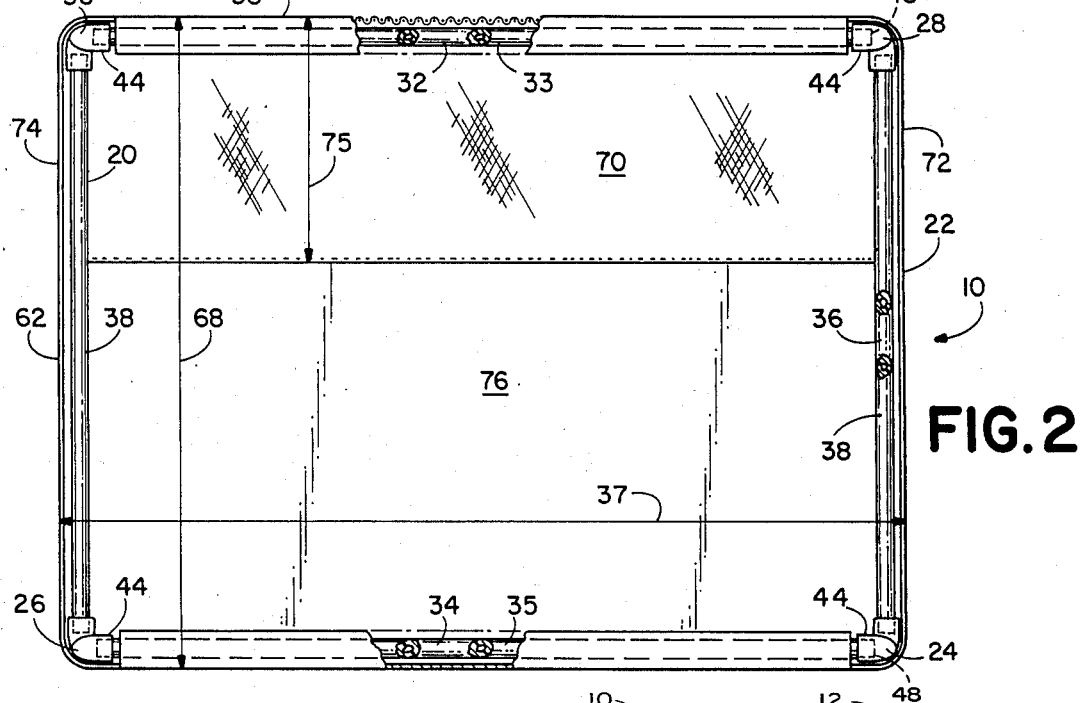
FIG. 2 is a partially cutaway rear elevational view of the pet carrier shown in FIG. 1.

Adjacent the front end 14 of the carrier, an upper transverse front horizontal member 32 of similar construction extends between the front ends of the upper longitudinal members 28 and 30, to maintain the proper lateral spacing between them. Similarly, a lower transverse front horizontal member 34, also shown in FIG. 2, extends laterally between the front ends of the lower longitudinal members 24 and 26. While the transverse horizontal members 32 and 34 are shown of equal width it will be apparent that they could be of different lengths in order to fit better inside a particular vehicle, with the cover 22 being appropriately shaped to fit.

A pair of laterally opposed upright support members 36, also of construction similar to that of the longitudinal members and transverse members of the frame 20, are located proximate the front end 14 of the carrier, extending supportingly between the upper and lower longitudinal frame members. Similarly, rear upright support members 38 of the frame 20 extend generally vertically between the upper and lower longitudinal frame members at each side of the frame 20, from a position proximate the rear end of the upper longitudinal members 28 and 30 to a location therebeneath on the lower longitudinal members 24 and 26, thus intersecting the lower longitudinal frame members 24 and 26 a short distance ahead of the rear ends of those members.

An upper rear transverse horizontal member 33 of similar construction extends between the rear ends of the upper longitudinal frame members 28 and 30, and a similar lower rear transverse horizontal member 35 extends between the rear ends of the lower longitudinal frame members 24 and 26, establishing a width 37 of the carrier 10.

Preferably, the elements 24, 26, 28, 30, 32, 33, 34, 35, 36, and 38 of the frame 20 are removably interconnected with one another by the provision of vertically-opposed sockets 40 and 42, located respectively on the underside of the upper longitudinal members 28 and 30 and the top of the lower longitudinal members 24 and 26. Similarly, there are inwardly-open opposed sockets 44 defined in the inwardly-directed ends of the upper longitudinal members 28 and 30, and similar sockets 46 located in the inwardly-directed ends of the lower longitudinal members 24 and 26. The ends 48 of each of the transverse horizontal members 32 and 34 and the upright members 36 and 38 fit matingly within respective ones of the sockets 40, 42, 44, and 46. The ends 48 fit removably yet snugly within the respective ones of the sockets 40, 42, 44, and 46 to provide the desired dimensions of the assembled frame 20. The distance to which each of the ends 48 extends into the respective socket may be established by means such as the provision of a ledge located at a predetermined depth within the respective socket.

The cover portion 22 of the carrier 10 is of a flexible sheet material, sewn or otherwise fastened into the desired shape to fit snugly about the outside of the frame 20, and includes a horizontal bottom 50 disposed beneath the frame, as well as an upright front wall 52, right side wall 54, left side wall 56, and a horizontal top 58. The rear of the carrier 10 is thus left open, so as to be available facing the tailgate opening of the motor vehicle 12 for entry or exit of the animal to be carried. The right and left side walls 54 and 56 define respective sloping rear margins 60 and 62, whose angle of inclination 63 is defined by the relative locations of the upper and lower transverse rear horizontal members 33 and 35, designed in different versions as necessary to fit different vehicles.

An upper rear transverse marginal portion of the top 58 of the cover 22 is folded inwardly and forward and is attached to the top 58 so as to form an upper rear tubular transverse marginal portion 64. A rear marginal portion of the bottom 50 is similarly folded upwardly and inwardly and attached to the top 50 so as to form a lower rear tubular transverse marginal portion 66. The upper rear tubular transverse marginal portion 64 is disposed about the upper transverse rear horizontal member 33, while the lower tubular transverse rear marginal portion 66 of the bottom 50 is similarly disposed about the lower transverse rear horizontal member 35 when the carrier 10 is fully assembled, so that the tubular rear marginal portions 64 and 66 hold the cover 22 properly in position surrounding the frame 20.

The carrier 10 has a height 68 which is suitable, together with the width 37, to permit the carrier 10 to be placed into or removed from the interior of the motor vehicle 12 with which the particular carrier 10 is designed for use, the height 68 also being chosen so as to be great enough to provide ample room for the pet intended to be carried in the carrier 10. Since the height 68 may cause the upper portion of the carrier 10 to be located between the operator of the vehicle and the rear windows of the vehicle, or between an interior rear view mirror of the vehicle and its rear windows, an upper portion 70 of the front wall 52, and upper portions 72 and 74 of the right side wall 54 and left side wall 56, respectively, are made of a substantially transparent textile fabric. This permits the operator of the motor vehicle 12 to see through the space occupied by the carrier 10 and safely operate the motor vehicle 12, even though the carrier 10 is located in the interior compartment of the vehicle. Additionally, the use of such fabric, of an open type, provides for passage of ample amounts of air, to be breathed by an animal enclosed within the carrier 10 and to keep such an animal cool enough for safety and comfort. The upper portions 70, 72, and 74 extend over at least the upper one-quarter of the height 68, and could extend downward a greater distance from the top 58. Preferably, the upper portions 70, 72 and 74 will extend upward from a level which is no higher than the height of seat backs or other obstructions which are inherent in the motor vehicle 12, itself, when the carrier 10 is in place in the vehicle 12. Thus, in an examplary carrier whose height 68 is 24 inches, the upper portions 70, 72 and 74 have a height 75 of 10 inches.

Lower portions 76, 78, and 80 of the front wall 52, right side wall 54, and left side wall 56, respectively, as well as the bottom 50, are preferably made of a watertight material capable of preventing mud, water, urine, and other materials from soiling the interior upholstery and carpets of the motor vehicle 12.

Materials which have been determined to be suitable for the construction of the cover 22 are a vinyl-sealed woven nylon fabric and a mesh material, available under the trademarks Herculite L25-2 and Herculite 10W from Herculite Products, Inc., New York, NY. Such waterproof material and mesh material can best be joined in seams made by thermal welding.

The carrier 10 of the invention is assembled for use by first assembling all of the members of the frame 20 except for the upper and lower rear transverse horizontal members 33 and 35. The frame in this partially assembled condition is then placed within the interior of the cover 22, after which one of the rear horizontal transverse frame members 33, 35 is inserted into the respective tubular rear margin portion 64 or 66 of the cover, and its ends 48 are inserted into the respective sockets 44 or 46. Thereafter, the other of the rear horizontal transverse frame members 33, 35 is inserted into the respective tubular rear margin 64 or 66 and its ends 48 are similarly mated into the respective socket 46 on one side of the carrier. Because the cover 22 of the carrier 10 is preferably manufactured to fit snugly over the frame 20 and thereby hold the parts of the frame together, it may then be necessary to bow the final one of the horizontal transverse members slightly while urging the rear end of the respective longitudinal member outwardly against the interior of the cover 22, until enough clearance has been gained in this manner to permit the final end 48 to be placed into its socket 44 or 46. Thereafter, the cover 22 will prevent the frame 20 from disassembling itself, as will the snugness of the fit of the ends 48 into their respective sockets 44 and 46 at the rear end 16 of the carrier.

The resulting pet carrier 10 as described above weights only 4 to 12 pounds in various sizes which will fit snugly within station wagons of various sizes. When collapsed, the carrier 10 occupies a relatively small amount of space and can be stored conveniently.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A lightweight pet carrier for restraining a pet within a motor vehicle without obstructing the vehicle operator's rearward field of vision, comprising:
   (a) a supporting frame having at least a pair of upstanding support members, and at least a pair of transverse horizontal support members; and
   (b) a cover of flexible fabric fitting snugly about said frame and defining a front wall, a pair of opposite side walls, a bottom, and a top, said bottom and a respective lowermost portion of each of said front wall and said side walls being of water-impervious material, and at least the uppermost one-fourth of each of said front wall and said side walls being of substantially transparent flexible material, wherein at least a portion of said substantially transparent flexible material is sufficiently pervious to air to provide ample ventilation for an animal located within the space surrounded by said cover supported by said frame.

2. The pet carrier of claim 1 wherein said top of said cover is of said substantially transparent flexible material.

3. The pet carrier of claim 1 wherein said substantially transparent flexible material is a knit mesh fabric.

4. The pet carrier of claim 1 wherein said substantially transparent flexible material is a woven mesh fabric.

5. The pet carrier of claim 1 wherein said substantially transparent flexible material is a netlike fabric.

6. The pet carrier of claim 1 wherein said cover defines a pair of tubular transverse marginal portions located respectively along the rearward extremity of each of said top and said bottom, said supporting frame including a pair of front transverse horizontal members located at a front end of said carrier adjacent said bottom and said top, respectively, and a lower transverse rear horizontal member and an upper transverse rear horizontal member, each of said transverse rear horizontal members being located in a respective one of said tubular transverse marginal portions of said cover.

7. The pet carrier of claim 6 wherein said bottom extends rearward farther than said top and said side walls include respective rear margins, inclined slopingly downward and rearward, from a location proximate said tubular transverse marginal portion located along the rearward extremity of said top, toward said tubular transverse marginal portion located along the rearward extremity of said bottom.

8. The pet carrier of claim 6 wherein said frame is of plastic pipe and includes four substantially vertical ones of said upstanding support members, a pair of laterally opposite horizontal longitudinal bottom frame members, and a pair of laterally opposite horizontal longitudinal top frame members, wherein one pair of substantially vertical upstanding frame members extend between respective locations on the ones of said pair of horizontal longitudinal upper frame members and closely adjacent said horizontal transverse rear member located at said rearward margin of said top, and respective locations on said lower longitudinal frame members therebelow.

9. A lightweight pet carrier for restraining a pet within a motor vehicle and protecting the interior of the vehicle without obstructing the vehicle operator's rearward visibility, comprising:
   (a) a frame, including
      (i) respective opposite right and left lower longitudinal members,
      (ii) respective opposite right and left upper longitudinal members,
      (iii) an upper front transverse member extending between said opposite right and left upper longitudinal members,
      (iv) a lower front transverse member extending between said opposite right and left lower longitudinal members,
      (v) an upper rear transverse member extending between said opposite upper longitudinal members,
      (vi) a lower rear transverse member extending between said opposite lower longitudinal members,
      (vii) at least one right and one left upright support member, each of said upright support members supporting an upper longitudinal member above a corresponding lower longitudinal member on a respective side of said pet carrier;
   (b) means included in each of said longitudinal members defining a plurality of socket for removably receiving respective portions of respective ones of said front and rear transverse members and of said upright members; and
   (c) a cover of flexible sheet material fitted around said frame, said cover including a bottom and a plurality of walls, at least the uppermost one-fourth of each of said walls being of substantially transparent flexible material.

10. The pet carrier of claim 9 wherein said cover defines an open rear of said pet carrier, at least a portion of said cover being of a pervious material extending over a sufficient area to ensure an ample supply of air being available to a pet held within said carrier, even assuming said open rear to be tightly covered.

11. The pet carrier of claim 9, said top and bottom each including a tubular rear margin and said upper and lower transverse members being located respectively in said tubular rear margins and retaining said cover in place about said frame.

12. The pet carrier of claim 9, said plurality of walls including a front wall, a left side wall, and a right side wall, at least said bottom and respective lowermost portions of each of said front wall, said right side wall, and said left side wall being of waterproof flexible material.

13. The pet carrier of claim 9, said plurality of walls including a front wall and said cover defining an open rear.

14. The pet carrier of claim 9 wherein the respective ones of said sockets are integral with respective ones of said longitudinal members of said frame, and portions of said transverse members and said upright support members are adapted to fit within respective ones of said sockets to a depth preventing removal therefrom when said frame is located within said cover, except by first flexing a part of said frame sufficiently to permit removal of one end of one of said rear transverse members from a respective socket associated with a respective one of said longitudinal horizontal frame members.

* * * * *

UNITED STATES PATENT AND TRADEMARK OFFICE
CERTIFICATE OF CORRECTION

PATENT NO. : 4,803,951

DATED : February 14, 1989

INVENTOR(S) : L. Dan Davis

It is certified that error appears in the above-identified patent and that said Letters Patent is hereby corrected as shown below:

Col. 2, line 8    Change "storagee" to --storage--

Col. 6, line 29   Change "weights" to --weighs--

Col. 8, line 13   Change "socket" to --sockets--

Signed and Sealed this

Fourth Day of September, 1990

Attest:

HARRY F. MANBECK, JR.

*Attesting Officer*    *Commissioner of Patents and Trademarks*